United States Patent
Wakizaka

(10) Patent No.: US 6,639,916 B1
(45) Date of Patent: Oct. 28, 2003

(54) AAL RECEIVING CIRCUIT AND METHOD OF PROCESSING ATM CELLS

(75) Inventor: Mayumi Wakizaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/359,372

(22) Filed: Jul. 23, 1999

(30) Foreign Application Priority Data

Jul. 23, 1998 (JP) .......................................... 10-208066

(51) Int. Cl.⁷ .......................... H04L 12/28; H04L 12/56
(52) U.S. Cl. .................... 370/397; 370/310.1; 370/389; 370/401
(58) Field of Search .............................. 370/397, 395.1, 370/398, 399, 395.3, 395.43, 395.5, 395.52, 395.6, 474, 470, 471, 469, 310.1, 320, 328, 336, 342, 352, 353, 356, 389, 396, 441, 465, 466, 479, 537, 538

(56) References Cited

U.S. PATENT DOCUMENTS

| | | | |
|---|---|---|---|
| 6,021,135 A | * 2/2000 | Ishihara et al. | 370/356 |
| 6,049,530 A | * 4/2000 | Petersen et al. | 370/248 |
| 6,266,343 B1 | * 7/2001 | Caves | 370/395.61 |
| 6,317,432 B1 | * 11/2001 | Ono et al. | 370/395.2 |
| 6,396,840 B1 | * 5/2002 | Rose et al. | 370/401 |
| 6,445,683 B1 | * 9/2002 | Nobuyasu et al. | 370/310.1 |
| 2001/0012293 A1 | * 8/2001 | Petersen et al. | 370/389 |

FOREIGN PATENT DOCUMENTS

| | | |
|---|---|---|
| EP | 0 827 305 | 3/1998 |
| JP | 9-181728 | 7/1997 |
| JP | 10-173673 | 6/1998 |
| JP | 11-74892 | 3/1999 |
| KR | 1996-12833 | 4/1996 |
| WO | WO 99/33313 | 7/1999 |

OTHER PUBLICATIONS

M.J. McTiffin et al., "Mobile Access to an ATM Network Using a CDMA Air Interface", Jun. 1, 1994; pp. 900–908; vol. 12, No. 5.

John H. Baldwin, et al., "A New ATM Adaptation Layer for Small Packet Encapsulation and Multiplexing", Mar. 21, 1997; pp. 111–131; vol. 2, No. 2.

Roy Mauger et al., "QoSs Guarantees for Multimedia Services on a TDMA–Based Satellite Network", Jul. 1, 1997; pp. 58;63–65; vol. 35, No. 7.

Goran Eneroth et al., "ATM Transport in Cellular Networks", Sep. 21, 1997; pp. 139–146; vol. 2.

Roy Mauger et al., "ATM Adaptation Layer Switching", Sep. 21, 1997; pp. 207–214; vol. 1.

* cited by examiner

*Primary Examiner*—Kenneth Vanderpuye
*Assistant Examiner*—Brian Nguyen
(74) *Attorney, Agent, or Firm*—Foley & Lardner

(57) ABSTRACT

Standard cells and AAL2 cells are processed by a single AAL terminating unit to reduce whole circuit scale of a radio communication system. An AAL identifying unit 3 determines whether an ATM cell is a standard cell or an AAL2 cell. When the ATM cell is a standard cell, the cell is transferred to the AAL terminating unit 7 as it is when the ATM cell is an AAL2 cell, the cell is assembled and to produce a plurality of ATM cells each of which corresponds to one of the short cells in the AAL2 cell and transferred to the unit 7. The unit 7 determines an AAL type of the ATM cell and processes then according to the AAL type.

17 Claims, 14 Drawing Sheets

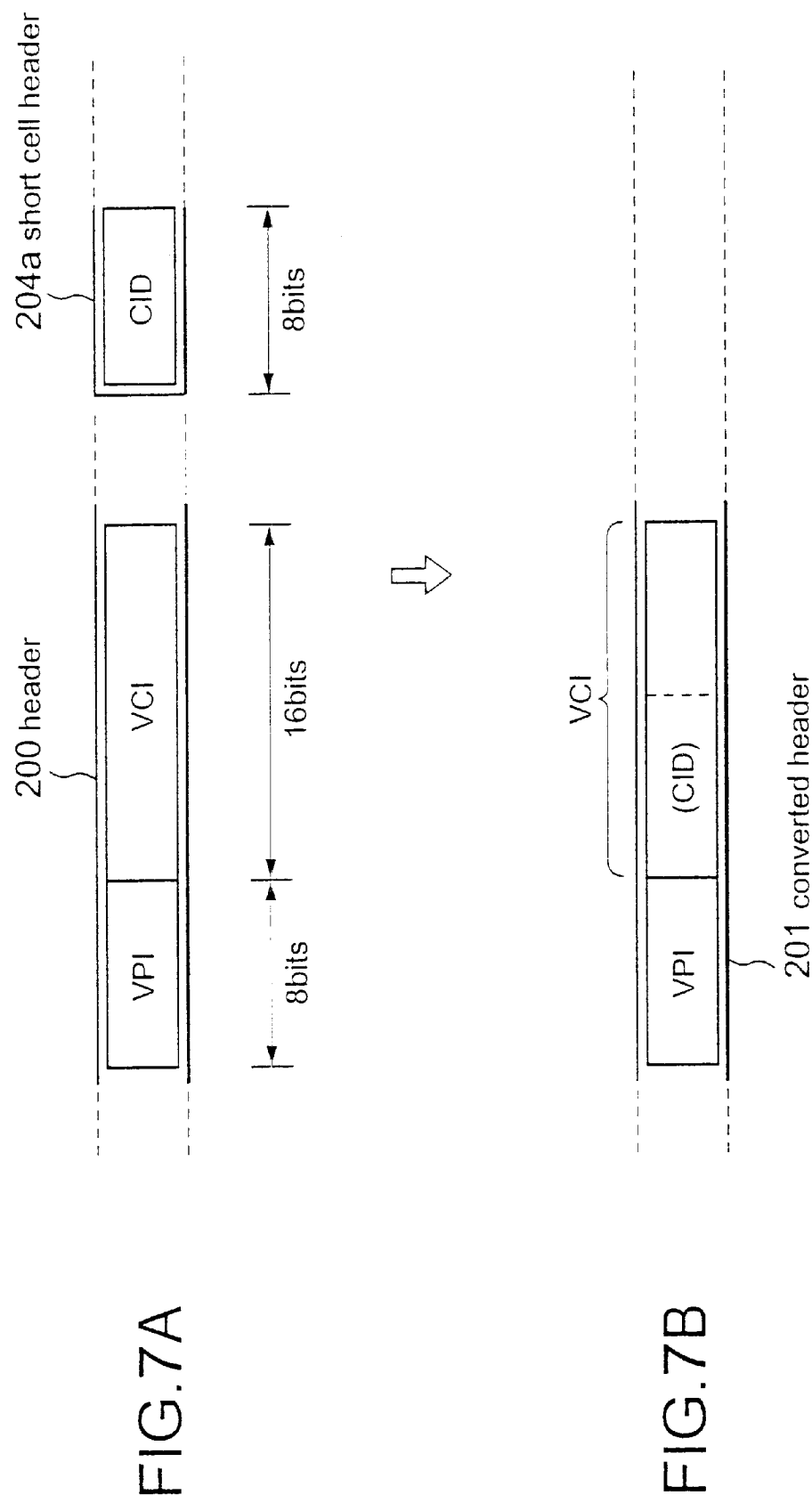

AAL RECEIVING CIRCUIT AND METHOD OF PROCESSING ATM CELLS

BACKGROUND OF THE INVENTION

1. Field of the Invention

The invention relates to a method of communicating in Asynchronous Transfer Mode (hereinafter, referred to as "ATM") and, in particular, to a method of communicating by using an AAL (ATM Adaptation Layer) receiving circuit.

2. Description of the Related Art

In the past, a technology about an ATM network has been enthusiastically developed as the Internet has been broadly spread. Information which is transferred in the ATM network is divided into a plurality of ATM cells each of which has 53 bytes of data, and the ATM cells are actually transferred through the ATM network. Each of the ATM cells is constructed of 48 bytes of "payload" which includes a part of the information and 5 bytes of "header" which includes a destination address and etc. Furthermore, in the destination address of the header, a VPI (Virtual Path Identifier) and a VCI (Virtual Channel Identifier) are included.

The ATM cells are transferred to the corresponding destination address through a plurality of ATM exchanges located in the ATM network. However, information about a VPI and a VCI is individually defined between a terminal and an ATM exchange, and between ATM exchanges. Therefore, each of the ATM exchanges, to transfer the ATM cells, should convert a VPI and a VCI in the ATM cell to another VPI and VCI that correspond to the next ATM exchange. Such conversion of the VPI and the VCI at the ATM exchanges is referred to as "header conversion".

A previous technique of the header conversion uses a header conversion table as disclosed in Japanese Laying-Open Publication No. H09-181728 (namely, 181728/1997). In this case, VPIs and VCIs of the outgoing ATM cells are previously stored into the header conversion table in correspondence with VPIs and VCIs of the incoming ATM cells, and the VPIs and the VCIs of the incoming ATM cells are replaced by the corresponding VCIs and VPIs in the header conversion table when the incoming cells arrived.

Therefore, when a header of an ATM cell is converted by using a header conversion table, a large amount of header conversion table is required to store possible ATM cell header information, and a circuit for retrieving the large table and a circuit for conversion are required. As a result, a scale of a circuit for the header conversion on a transmission line interface becomes huge.

Also, the ATM cells may include voice, images, and the other kinds of data. Then, to treat each type of the data, the ATM cells are defined in a plurality of types of protocols (AAL type 1 through type 5). The AAL type of the ATM cells can be identified by referring to a value of a VCI included in the ATM cells.

It often happens that there may be a large amount of vacant area in the payload when an ATM cell is used for sending data of a single user, and when the amount of the data is much less than a payload in the ATM cell.

To avoid such occurrence of the large amount of vacant area, a type of ATM cell has been proposed which can collectively include data which are to be transmitted from a plurality of users and which have different destinations. The type is referred to as AAL type 2 (hereinafter, called as "AAL2") and the type is defined by ITU-T (International Telecommunication Union-Telecommunication Standardization Sector) recommendation I.363.2.

Therefore, an AAL2 cell is normally used when voice information, which has a small size and a short allowable delay time, is transferred. On the other hand, a standard cell is often used on transferring the other information, which has a large size and a long allowable delay time.

In the past, in an AAL receiving circuit, for example, in a radio base station, provision has been made to receive both the standard cell and the AAL2 cell. However, since the earlier AAL receiving circuit must produce an individual header of the standard ATM cell from the AAL2 cell which collects data of a plurality of users, the AAL receiving circuit must include AAL terminating units for the AAL2 cell and AAL terminating units for the standard ATM cell, individually. Further, since it can not be known in advance that either type of the cells is mainly transferred, a large number of both types of the AAL terminating units are needed even if all the units are not fully used. Therefore, the scale of the AAL receiving circuit becomes large, and as a result, the scale of a radio base station including the AAL receiving circuit also becomes large.

In recent years, attention has been focused on a radio communication system employing CDMA (Code Division Multiple Access) as next generation radio communication system. Using a W-CDMA (wide band-CDMA), which is one of the techniques employing CDMA, information between a radio base station and an exchange is transferred in the form of ATM cells. Therefore, in the radio base station including previous AAL receiving circuit as described above, enhancing the number of the communication lines leads to increasing a scale of the circuit, as a result, efficient usage of frequency band, which is advantage of CDMA, is degraded.

More detail description is made about the previous AAL receiving circuit.

Eight bits of a field are assigned to a VPI based on the UNI (User Node Interface), and 12 bits of field are assigned based on the NNI (Network Node Interface). A field of sixteen (16) bits is assigned to a VCI based on UNI and NNI. FIG. 1 shows a header format of an ATM cell based on UNI.

The header also includes three bits of PT (Payload Type), a single (8) bit of CLP (Cell Loss Priority), and an eight bits of HEC (Header Error Control).

Next, description is made about the case where messages of users A, B, and C shown in FIG. 2A will be sent through the same path until they reach an intermediate portion located on the way to their destinations. Here, the message of the user A has twelve (12) bytes length, the message of the user B has eighteen (18) bytes length, and the message of the user C has six (6) bytes length. When these messages are sent through an ATM cell other than AAL2 type cell (hereinafter, referred to as "standard cell"), each of the messages is included in a ATM cell different from each other as shown in FIG. 2(b). In FIG. 2B, an ATM cell containing the message of the user A has 36 bytes of vacant space out of 48 bytes payload. The vacant space is shown as a shaded portion. Similarly, an ATM cell containing the message of the user B has a 30 bytes of vacant space, and an ATM cell containing the message of the user C has a 42 bytes of vacant space.

FIG. 2C shows format of an ATM cell when the above messages are sent in AAL2 cell.

As shown in FIG. 2C, the AAL2 cell includes short cells (also called "CPS (Common Part Sub-layer) packet") containing the messages of users A, B. and C, and STF (start field) 111. Each of the short cells includes the message of the user (short cell payload) and the short cell header (110a, 110b, or 110c). The STF 111 has 1 byte length and each of the short cells (110a, 110b, and 110c) has 3 bytes length. Therefore, the 48 bytes of payload of the ATM cell shown in FIG. 2C is occupied by 46 bytes of data (1 (STF 111) +3 (short cell header)×3+12+18+6=46), and the only 2 bytes of area is unused.

Here, more detail description is made about the above AAL2 cell with reference to FIG. 3.

As described above, the 48 bytes of payload in the AAL2 cell includes the 1 byte of STF 111 and a plurality of short cells.

The STF 111 further includes 6 bits of OSF (offset field), a 1 bit of SN (sequence number), and a 1 bit of P (odd parity of the STF). In FIG. 3, each of the numbers in parentheses indicates the number of bits of the corresponding data. The OSF indicates a boundary of a first short cell.

Also, each of the short cells includes 3 bytes of short cell header and a short cell payload which has a variable length. The short cell header includes 8 bits of CID (Channel Identifier), 6 bits of LI (Length Indicator), 5 bits of UUI (User-to-User Indication), and 5 bits of HEC (Header Error Control). The CID includes destination information to which the short cell is to be transferred in a manner similar to a VCI.

Next, description is made about an AAL receiving circuit which sends/receives ATM cells including different AAL types.

FIG. 4 shows a block diagram of a radio communication system in which a radio base station which includes an AAL receiving circuit of the previous technique.

The radio communication system includes a plurality of mobile stations $20_1$ and $20_2$, a radio base station 88, and an exchange 1 which is connected to the radio base station 88 via an ATM transmission line 10.

Also, the radio base station 88 includes radio units $83_1$ to $83_n$, n in number, radio units $93_1$ to $93_n$, n in number, and an AAL receiving circuit 82.

In FIG. 4, the mobile station $20_1$ communicates voice information via a radio network between the mobile station $20_1$ and the radio unit $93_n$. Further, the mobile station $20_2$ communicates data via a radio network between the mobile station $20_2$ and the radio unit $83_1$, and transfers the data to a personal computer 22 via an adapter 21.

The AAL receiving circuit 82 includes an AAL identifying unit 3, a standard cell interchanging unit 4, an AAL2 assembling unit 5, a header converting unit 81, AAL terminating units, n in number, for standard cell $87_1$ to $87_n$, and AAL terminating units, n in number, for AAL2 cell $97_1$ to $97_n$.

The AAL identifying unit 3 determines a value of a VCI in an ATM cell from the ATM transmission line 10 and identifies the type of the ATM cell based on the value of the VCI. When the ATM cell is identified as an AAL2 cell, the ATM cell is transferred to the AAL2 assembling unit 5. On the other hand, when the ATM cell is identified as a standard cell and judged as a cell other than an AAL2 cell, the ATM cell is transferred to the standard cell interchanging unit 4.

The standard cell interchanging unit 4 sends the received standard cell to the AAL terminating units for standard cell $87_1$ to $87_n$ without any change.

The AAL2 assembling unit 5 disassembles the received AAL2 cell into a plurality of cells each of which corresponds to one of short cells and appends an original ATM header to each of the cells to produce a standard cell.

Also, the AAL2 assembling unit 5 includes, as shown in FIG. 5, an OSF terminating unit 51, a short cell assembling unit 52, an ATM header appending unit 53, and a standard cell assembling unit 54.

The OSF terminating unit 51 terminates an offset field included in a payload of the received AAL2 cell.

The short cell assembling unit 52 assembles each of the short cells included in the received AAL2 cell as individual cells.

The ATM cell header appending unit 53 appends a header to each of the individual cells. Then, the standard cell assembling unit 54 assembles each of the cells into a cell having the same format as the standard cell.

Next, returning back to FIG. 4, the header converting unit 81 converts a header of each of the cells assembled by the AAL2 assembling unit 5 into a header including the corresponding destination of the user message. In particular, the unit 81 sets each of the CIDs in short cells into the corresponding header, which is appended by the ATM cell header appending unit 53. The above conversion by the header converting unit 81 is achieved using the header conversion table which includes new headers each of which is related to a header to be replaced by it.

Then, detailed description is made about processing executed by the AAL2 assembling unit 5 and the header converting unit 81 with reference to FIG. 6.

Format of the AAL2 cell sent from the AAL identifying unit 3 is shown in FIG. 6A. The AAL2 cell includes a header 200 and a payload. The STF in the payload includes the OSF 203. Further, the payload includes one short cell including a short cell header 204a and a short cell payload 205a, and the other short cell including a short cell header 204b and a short cell payload 205b.

The AAL2 cell shown in FIG. 6A is converted into two ATM cells shown in FIG. 6B by processing of the AAL2 assembling unit 5. Headers 200 of the two ATM cells are similar to the ATM cell header 200 shown in FIG. 6A. In the illustrated example, a payload in one ATM cell includes a short cell header 204a and a short cell payload 205a, while a payload in the other ATM cell includes a short cell header 204b and a short cell payload 205b.

Then, the two ATM cells are each converted to produce two individual ATM cells shown in FIG. 6C by performing header conversion at the header converting unit 81. Each of payloads in the two ATM cells shown in FIG. 6C includes only a short cell payload (205a or 205b).

Next, more detail description is made about header conversion of the header converting unit 81 with reference to FIG. 7. In this case, header conversion of an ATM cell is performed. The ATM cell includes a short cell including a short cell header 204a and a short cell payload 205a (not shown). In this example, a CID is set into higher significant eight bits of a VCI, when all of the higher significant eight bits of the VCI have been originally set to zero and unused.

FIG. 7A shows a format of the ATM cell before header conversion is performed, while, FIG. 7B shows format of the ATM cell after header conversion is performed.

As shown in FIG. 7A, the header 200 of the ATM cell before header conversion includes 8 bits of VPI and 16 bits of VCI, and a short cell header 204a including 8 bits of CID.

Then, the header converting unit 81 converts the header 200 by replacing the 16 bits of VCI with the 8 bits of CID at the high order 8 bits, and the low order 8 bits of the original VCI remain in the low order 8 bits. By the conversion, the header 200 is converted to the header 201.

The two ATM cell headers 200 shown in FIG. 6B are identical to each other, while destinations are different from each other. Therefore, the two ATM cell headers must be converted so that each of the ATM cells is transferred to correct destination.

However, as described above, when a header of an ATM cell from the AAL2 assembling unit 5 is converted by the header converting unit 81, the converted ATM cell does not have a standard format. Therefore, the converted ATM cell can not be treated as similar to a standard ATM cell which passes through the standard cell interchange unit 4.

As a result, AAL terminating units for a standard cell $87_1$ to $87_n$ and AAL terminating units for an AAL2 cell $97_1$ to $97_n$ must be separately located.

Each of the AAL terminating units for a standard cell $87_1$ to $87_n$ detects a destination included in a standard ATM cell sent from the standard cell interchange 4, and transfers the information included in a payload of the ATM cell to one of the radio units $83_1$ to $83_n$ if the destination is a predetermined one.

Each of the AAL terminating units for an AAL2 cell $97_1$ to $97_n$ detects a destination included in an ATM cell sent from the header converting unit 81, and transfers the information included in a payload of the ATM cell to one of the radio units $93_1$ to $93_n$ if the destination is a predetermined one.

Then, each of the radio units $83_1$ to $83_n$ and $93_1$ to $93_n$ sends the information from the AAL terminating units for a standard cell $87_1$ to $87_n$ and the AAL terminating units for an AAL2 cell $97_1$ to $97_n$, to each mobile stations $20_1$ and $20_2$ via a radio network.

The previous AAL receiving circuit 82, for example, in a radio base station, converts a header of the AAL2 cell into a header including a CID rather than a standard format header. Therefore, the AAL receiving circuit 82 must include an AAL terminating units for the AAL2 cell and an AAL terminating units for the standard cell, separately.

However, since the number of cells which are received is not known for each AAL type of cell when the radio base station has n of the communication lines, n of the AAL terminating units for a standard cell and n of the AAL terminating units for an AAL2 cell are needed even if all the units are not actually used. Therefore, a scale of the AAL receiving circuit 82 becomes large, as a result, a scale of the radio base station including the AAL receiving circuit also becomes large.

SUMMARY OF THE INVENTION

Therefore, it is an object of the invention to provide an improved AAL receiving circuit operable to commonly treat AAL2 cells and standard cells in a single AAL terminating unit.

Further, it is an another object of the invention to provide an improved AAL receiving circuit which can reduce a scale of circuit by eliminating header conversion.

According to a first aspect of the invention, there is provided an AAL receiving circuit which includes an AAL identifying unit which identifies an AAL type of the ATM cell based on a value of a VCI included in the ATM cell, a standard cell interchanging unit which receives the ATM cell and transfers the ATM cell with no change when the ATM cell is determined as a standard cell at the AAL identifying unit, an AAL2 assembling unit which receives the ATM cell, divides the ATM cell for each short cell, appends a header of the ATM cell to each of the divided ATM cells, converts them in a form of the standard cell, and transfers them as an ATM cell, when the ATM cell is determined as an AAL2 cell, a cell multiplexer which multiplexes the ATM cells which are transferred from the standard cell interchanging unit and the AAL2 assembling unit, and transfers them to a common ATM bus, and at least one AAL terminating unit which determines the AAL type of the ATM cell which is transferred from the common ATM bus and processes the ATM cell according to the determined AAL type.

According to a second aspect of the invention, there is provided an AAL receiving circuit which includes an AAL identifying unit which identifies an AAL type of the ATM cell based on a value of a VCI included in the ATM cell, a standard cell interchanging unit which receives the ATM cell and transfers the ATM cell with no change, when the ATM cell is determined as a standard cell at the AAL identifying unit, an AAL2 assembling unit which receives the ATM cell, divides the ATM cell for each short cell, appends a header of the ATM cell to each of the divided ATM cells, converts them in a form of the standard cell, and transfers them as an ATM cell when the ATM cell is determined as an AAL2 cell, a cell multiplexer which multiplexes the ATM cells which are transferred from the standard cell interchanging unit and the AAL2 assembling unit, and which transfers them to a common ATM bus, a cell distributing unit which determines the AAL type of the ATM cell which is transferred from the cell multiplexer and transfers the ATM cell with processing according to the determined AAL type, and at least one AAL terminating unit which processes the ATM cell from the cell distributing unit according to the determined AAL type.

According to a third aspect of the invention, there is provided a method of AAL processing of an ATM cell. Wherein, the method comprises the steps of identifying an AAL type of a received ATM cell based on a value of a VCI of the ATM cell, dividing the ATM cell for each short cells, appending a header of the ATM cell to the short cells, and converting them into the same form as a standard ATM cell, only when the ATM cell is determined as an AAL2 cell, multiplexing a standard ATM cell and the ATM cells which are obtained by the above conversion, and transferring them to a common ATM bus, and referring to an AAL type of the ATM cell from the common ATM bus, processing the ATM cell according to predetermined definition which corresponds to the standard cell when the ATM cell is determined as a standard cell, determining a destination of the ATM cell by referring to a CID in a header of the ATM cell and processing the ATM cell according to predetermined definition which corresponds to the AAL2 cell when the ATM cell is determined as a AAL2 cell.

According to a fourth aspect of the invention, there is provided a method of AAL processing of an ATM cell. The method comprises the steps of identifying an AAL type of a received ATM cell based on a value of a VCI of the ATM cell, dividing the ATM cell for each short cells cell, appending a header of the ATM cell to the short cells, and converting them into the same form as a standard ATM cell only when the ATM cell is determined as an AAL2 cell, determining a destination of the ATM cell from a VPI/VCI in a header of the ATM cell and transferring the ATM cell to a communication network which corresponds to the destination when the ATM cell is determined as a standard cell, and determining a destination of the ATM cell by referring to a CID in a header of the ATM cell and transferring the ATM cell to a communication network which corresponds to the destination when the ATM cell is determined as an AAL2 cell, and processing, at the communication network, the ATM cell according to the AAL type of the ATM cell.

According to a fifth aspect of the invention, there is provided a receiving circuit which includes a determining unit which determines whether the received packet has a first type defined by a standard structure or a second type defined by a structure including multiple messages each of which is to be sent in a packet, a standard packet interchanging unit which receives the packet and transfers the packet with no change when the packet is determined as a packet of the first type at the determining unit, an assembling unit which is operable in response to the second type of the received packet and which receives the packet, divides the packet for each messages in the packet, appends a header of the packet to each of the divided messages, converts them in a form of an individual packet, and transfers them as a packet, a packet multiplexer which multiplexes the packets transferred from the standard packet interchanging unit and the assembling unit, and which transfers them to a common bus, and at least one terminating unit which determines either one of the first and the second types transferred from the common bus and which processes the packet according to the determined type of the packet.

According to a sixth aspect of the invention, there is provided a method of receiving a packet. The method comprises the steps of (a) determining whether the received packet has a first type defined by a standard structure or a second type defined by a structure including multiple messages each of which is to be sent in a packet, (b) receiving the packet and transferring the packet with no change when the packet is determined as a packet of the first type, (c) receiving the packet, dividing the packet for each messages in the packet, appending a header of the packet to each of the divided messages, converting them in a form of an individual packet, and transferring them as a packet, when the packet is determined a packet of the second type, (d) multiplexing the packets which are formed by (b) and (c), and transferring them, and (e) determining either one of the first and the second types and processing the packet according to the determined type.

BRIEF DESCRIPTION OF THE DRAWINGS

FIG. 7A shows format of an ATM cell before header conversion;

FIG. 7B shows format of an ATM cell after header conversion;

DESCRIPTION OF THE PREFERRED EMBODIMENT

First Embodiment of the Invention

Figure 1:
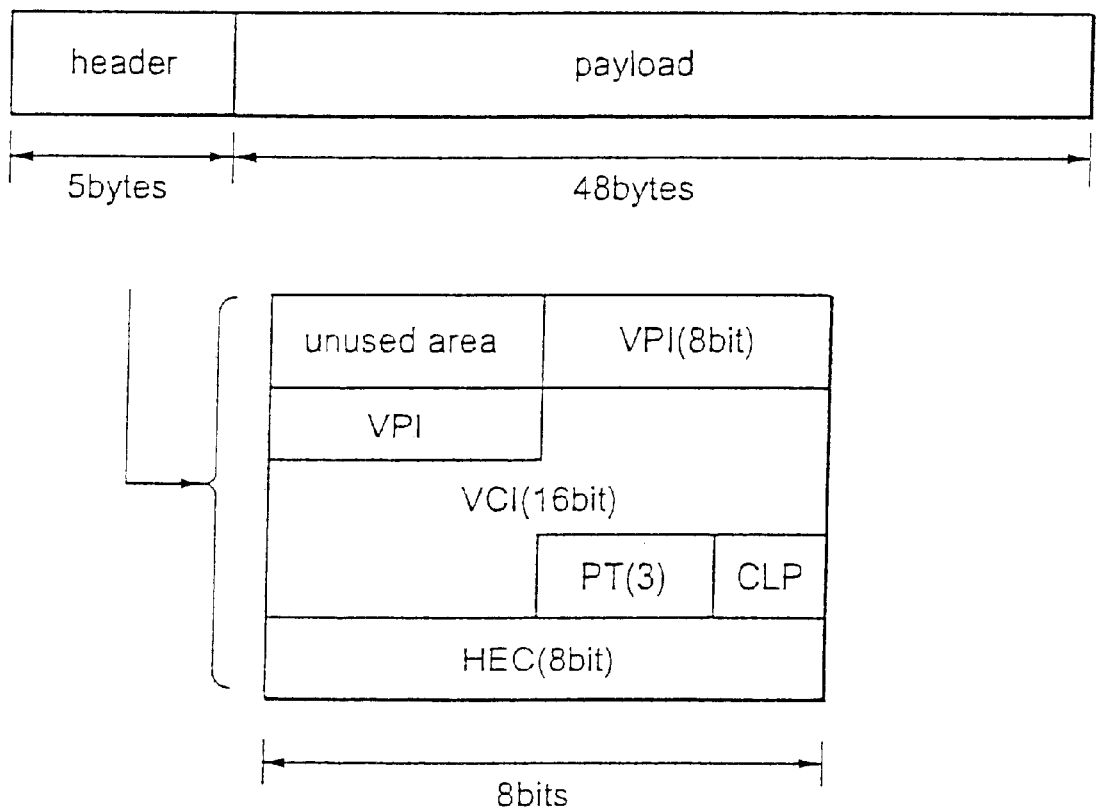
FIG. 1 shows format of an ATM cell.
Figure 2A:
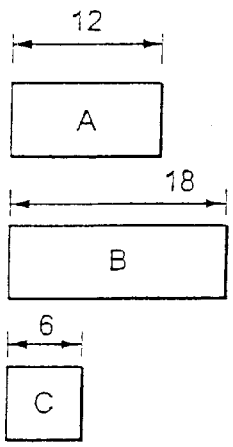
FIG. 2A shows an example of messages of users A, B, and C.
Figure 2B:
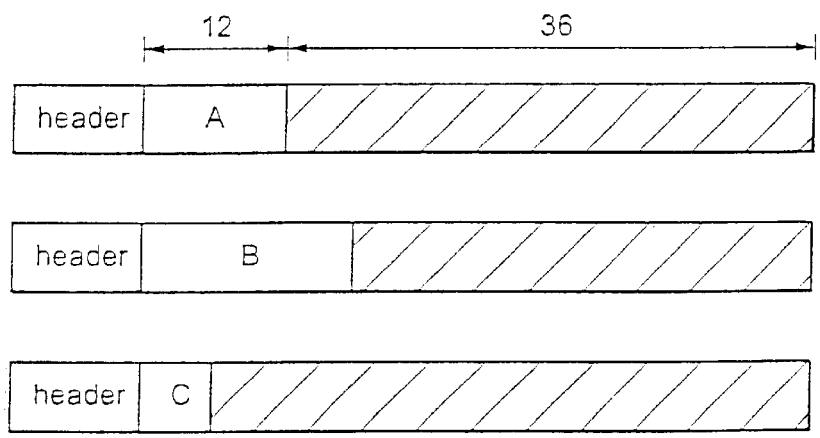
FIG. 2B shows an example of standard ATM cells including the messages of the user A, B, and C.
Figure 2C:
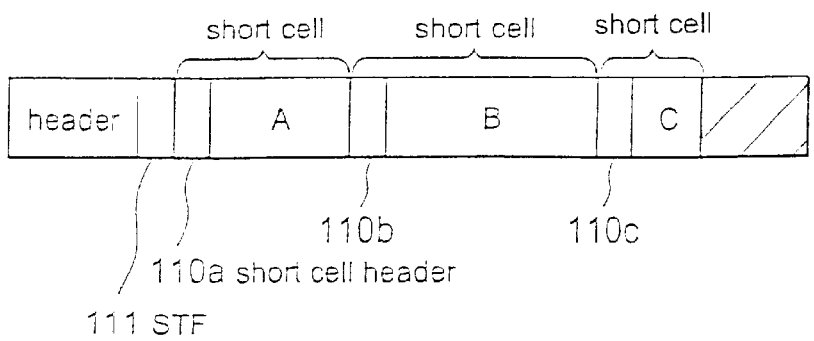
FIG. 2C shows an example of an AAL2 cell including the messages of the user A, B, and C.
Figure 3:
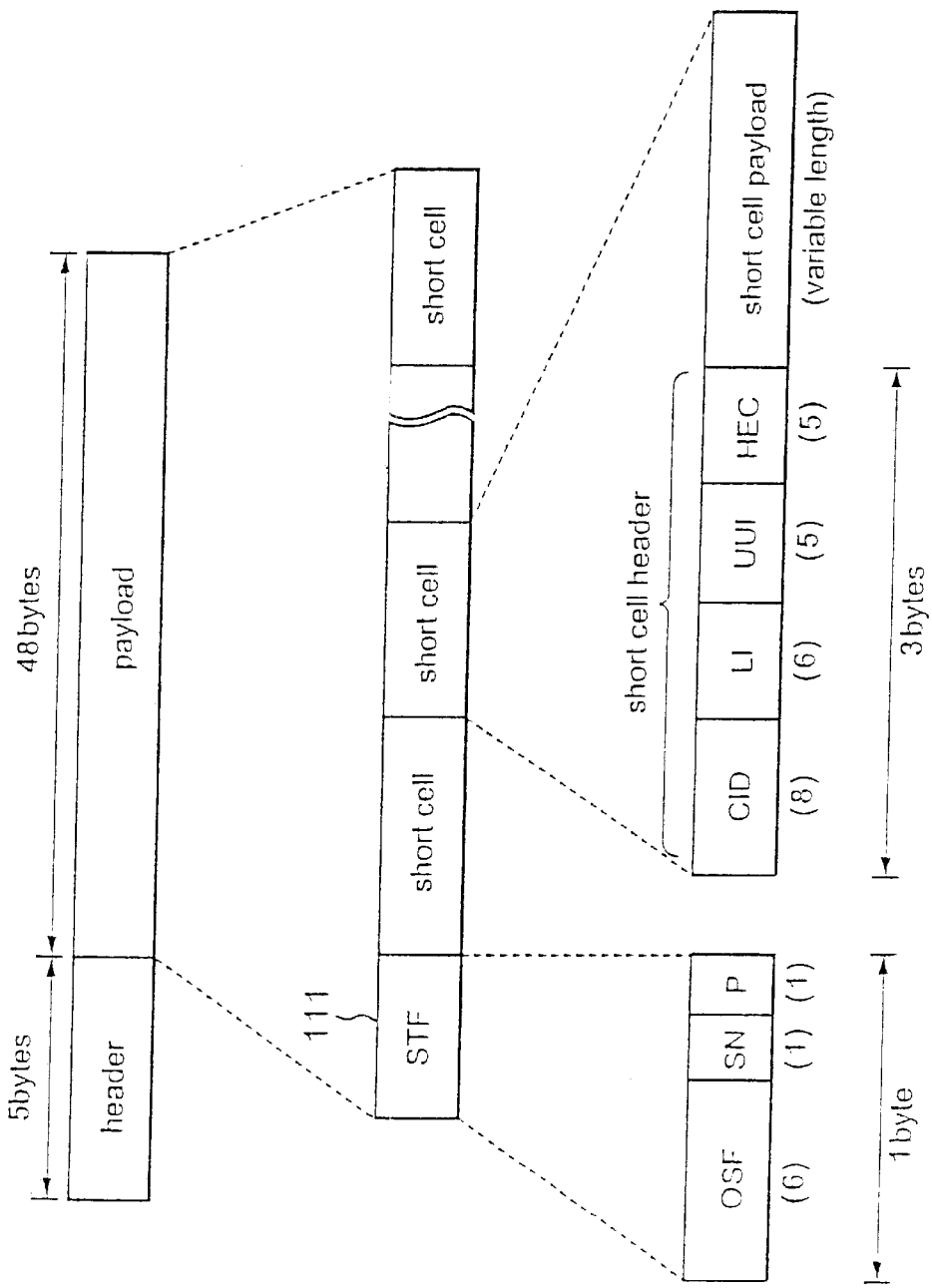
FIG. 3 shows format of an AAL2 cell.
Figure 4:
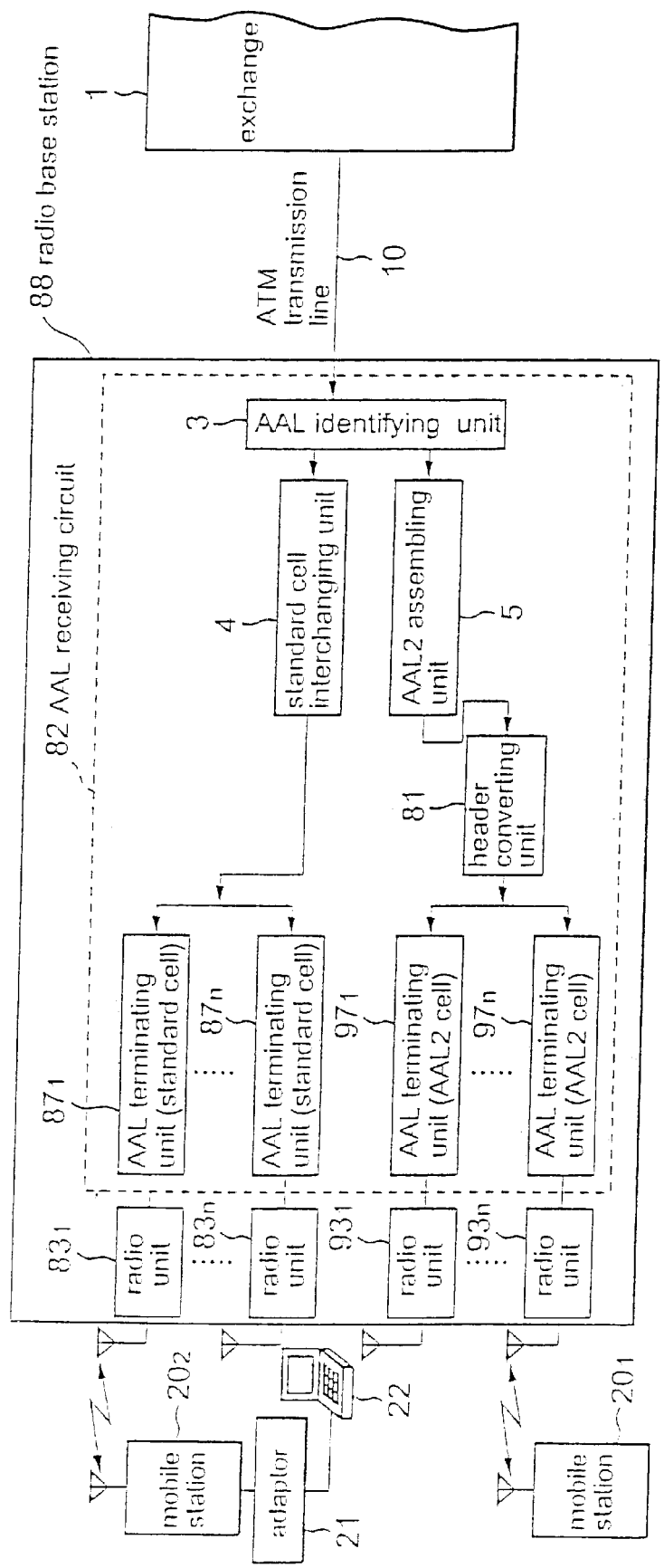
FIG. 4 shows a block diagram representing a radio communication system having a previous AAL receiving circuit.
Figure 5:
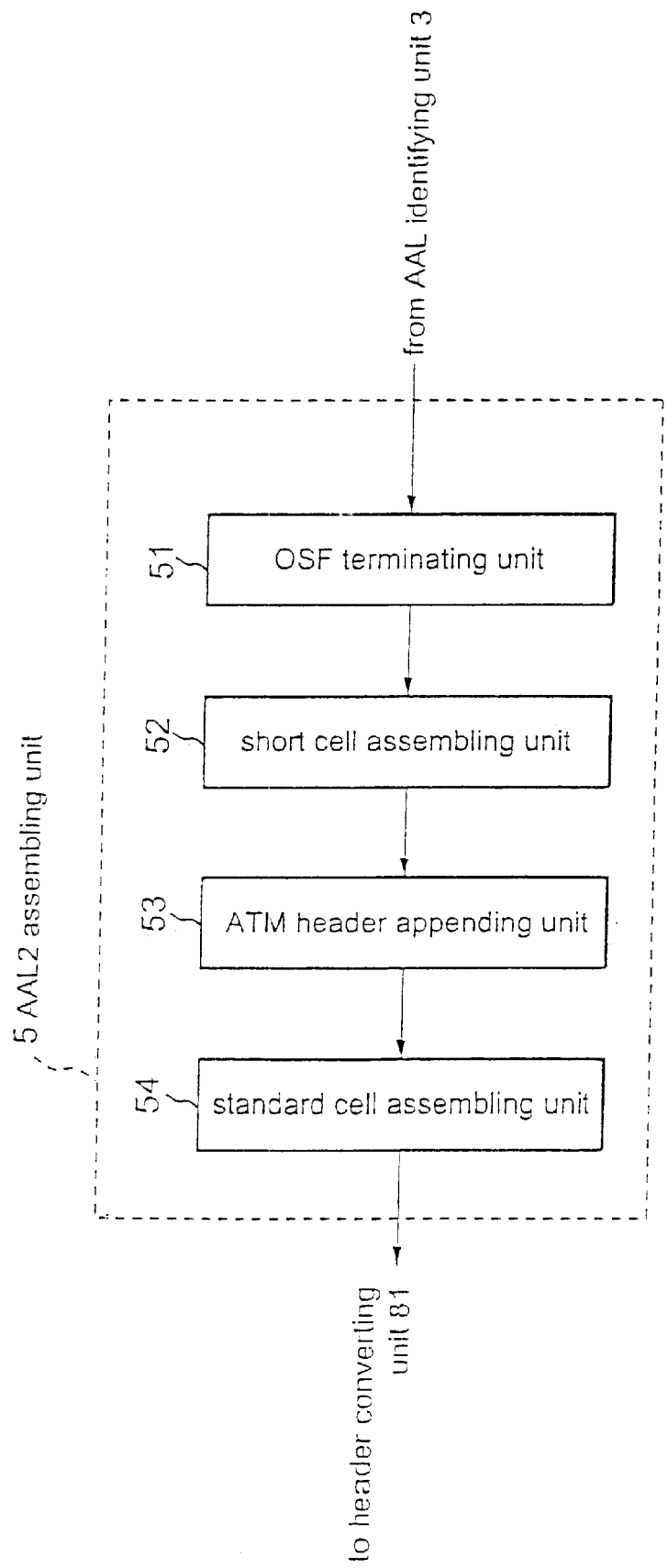
FIG. 5 shows a block diagram representing a configuration of the AAL2 assembling unit 5 shown in FIG. 4.
Figure 6A:
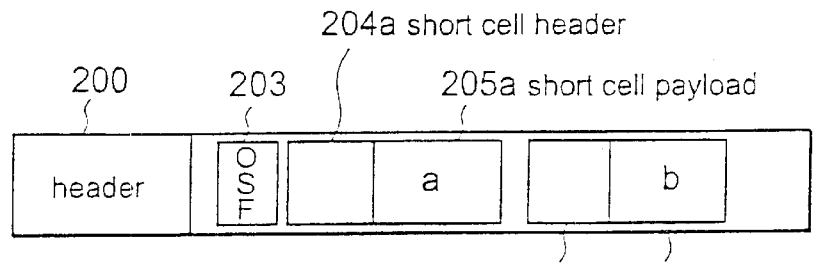
FIG. 6A shows an example of an AAL2 cell.
Figure 6B:
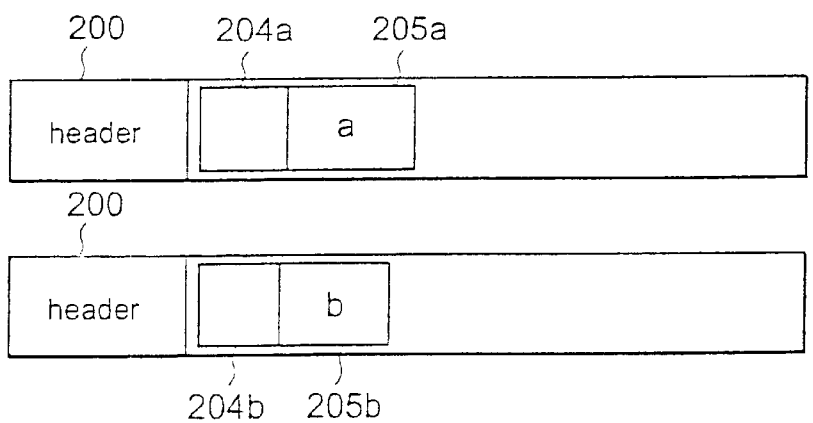
FIG. 6B shows an example of ATM cells after assembling of the AAL2 cell of FIG. 6A.
Figure 6C:
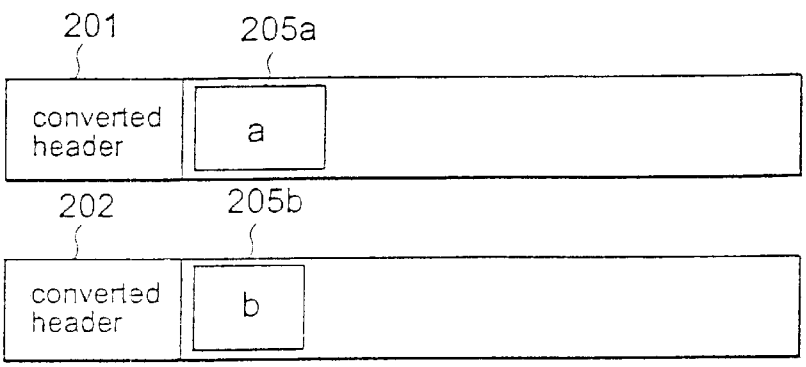
FIG. 6C shows an example of ATM cells after header conversion.
Figure 8:
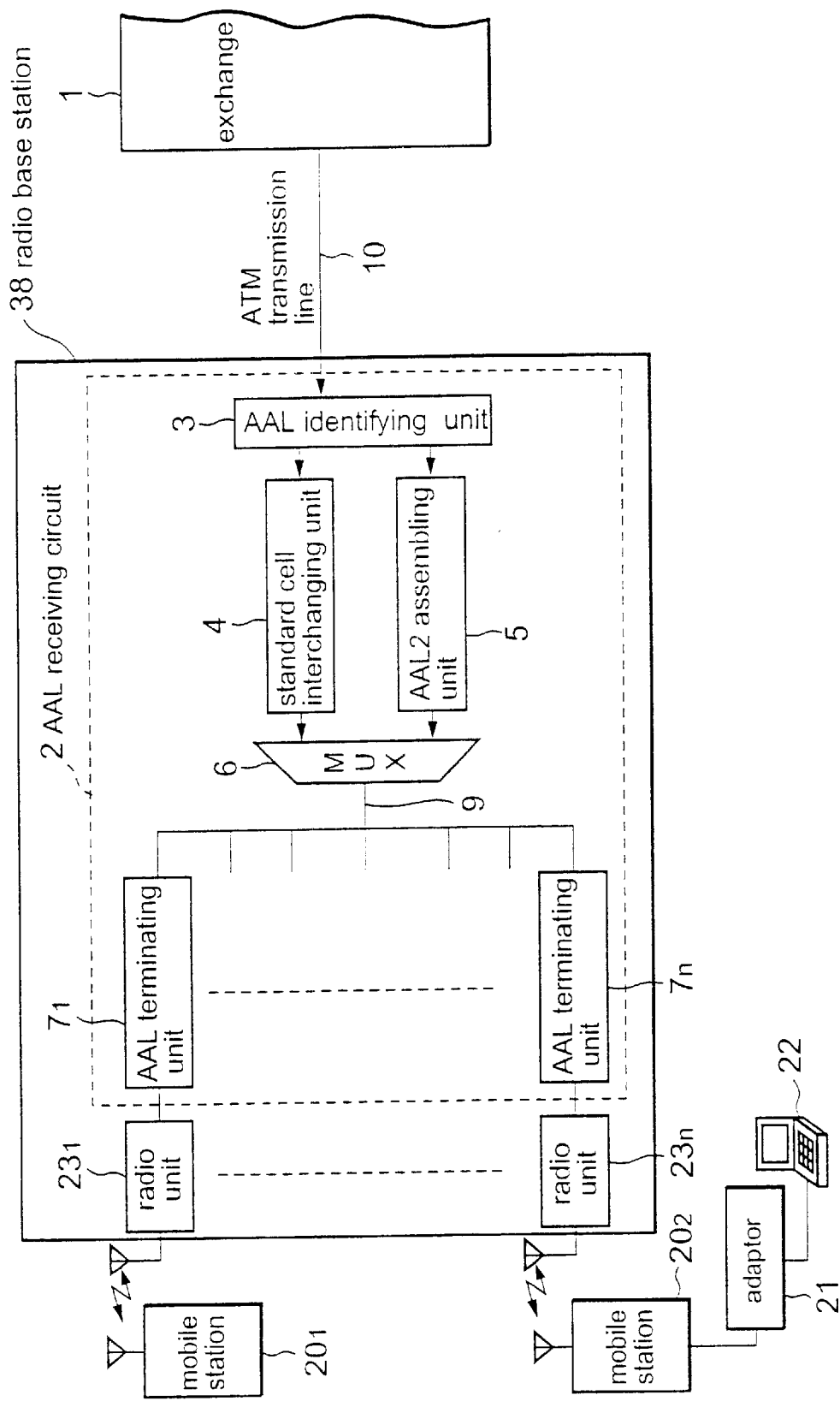
FIG. 8 shows a block diagram of a radio communication system employing the AAL receiving circuit 2 according to the first embodiment of the invention.

FIG. 8 shows a block diagram of the first embodiment of the invention and parts shown in FIG. 8 each of which is the same as the corresponding part shown in FIG. 4 have the same numeric symbols as the corresponding parts shown in FIG. 4.

A radio base station 38 of the first embodiment of the invention includes an AAL receiving circuit 2 and radio units $23_1$ to $23_n$.

The AAL receiving circuit 2 includes the AAL identifying unit 3, the standard cell interchanging unit 4, the AAL2 assembling unit 5, a cell multiplexer (MUX) 6, and AAL terminating units $7_1$ to $7_n$.

The cell multiplexer 6 multiplexes standard cells from the standard cell interchange unit 4 and ATM cells which are sent from the AAL2 assembling unit 5 and each of which is converted from one of short cells in an AAL2 cell to a standard cell. Then the multiplexed cells are sent to the AAL terminating units 71 to 7n via the common ATM bus 9.

Figure 9:
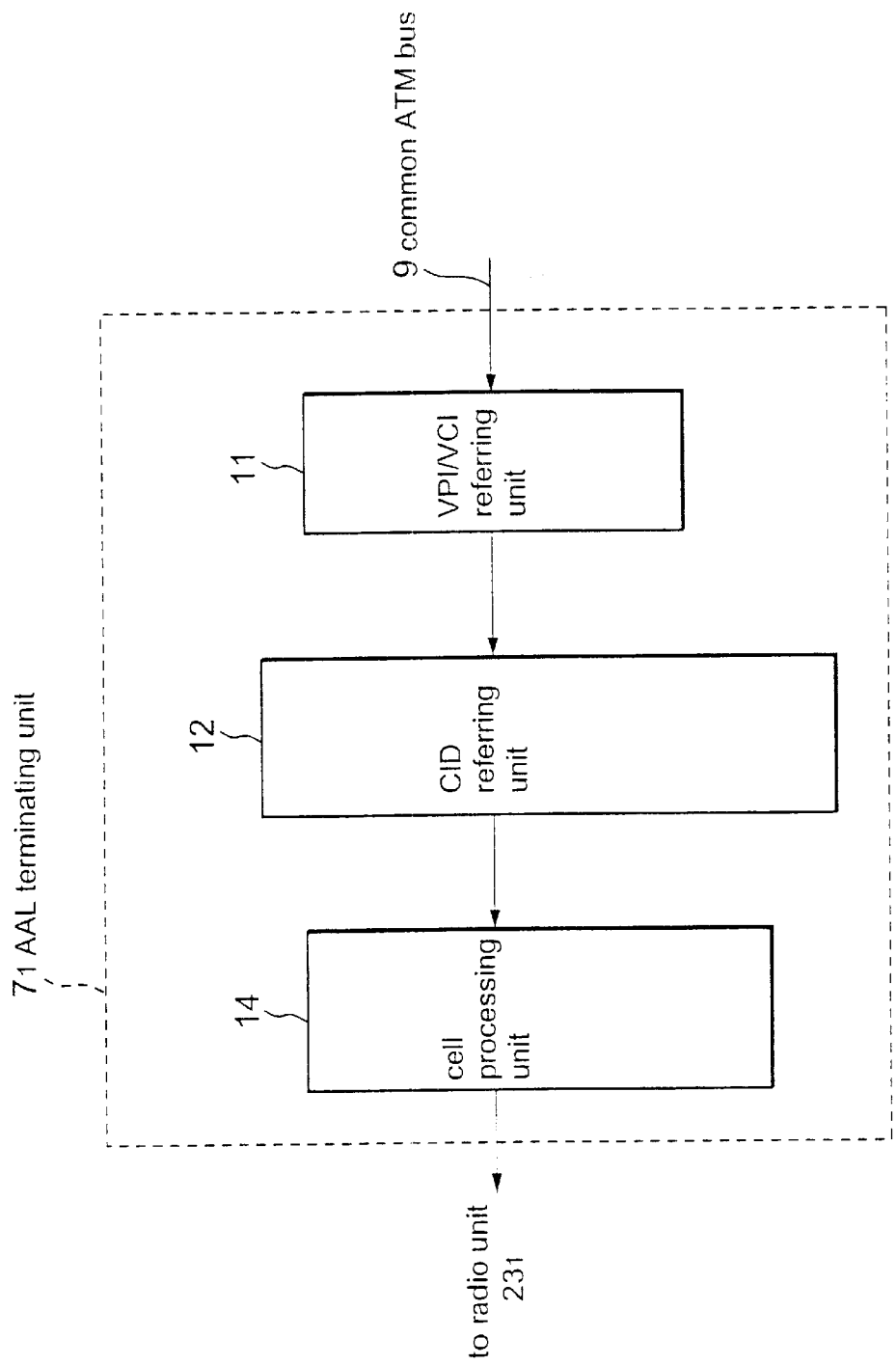
FIG. 9 shows a block diagram of the AAL terminating unit 71 shown in FIG. 8.

As shown in FIG. 9, the AAL terminating unit $7_1$ includes a VPI/VCI referring unit 11, a CID referring unit 12, and a cell processing unit 14. The VPI/VCI referring unit 11 refers to VPI/VCI of an ATM cell transferred from the cell multiplexer 6 via the common ATM bus 9 and determines the destination of the ATM cell and whether the ATM cell is an AAL2 cell or a standard cell.

The CID referring unit 12 transfers the ATM cell with no change if the ATM cell is determined as a standard cell at the VPI/VCI referring unit 11. On the other hand, the CID referring unit 12 refers to a CID included in a short cell header of the ATM cell and determines the destination of the ATM cell if the ATM cell is determined as an AAL2 cell.

The cell processing unit 14 processes an ATM cell from the CID referring unit 12 according to the determined AAL type.

Since the AAL terminating units $7_2$ to $7_n$ are coincident with the AAL terminating unit $7_1$, description will be omitted about the units $7_2$ to $7_n$.

Figures 10A, 10B:
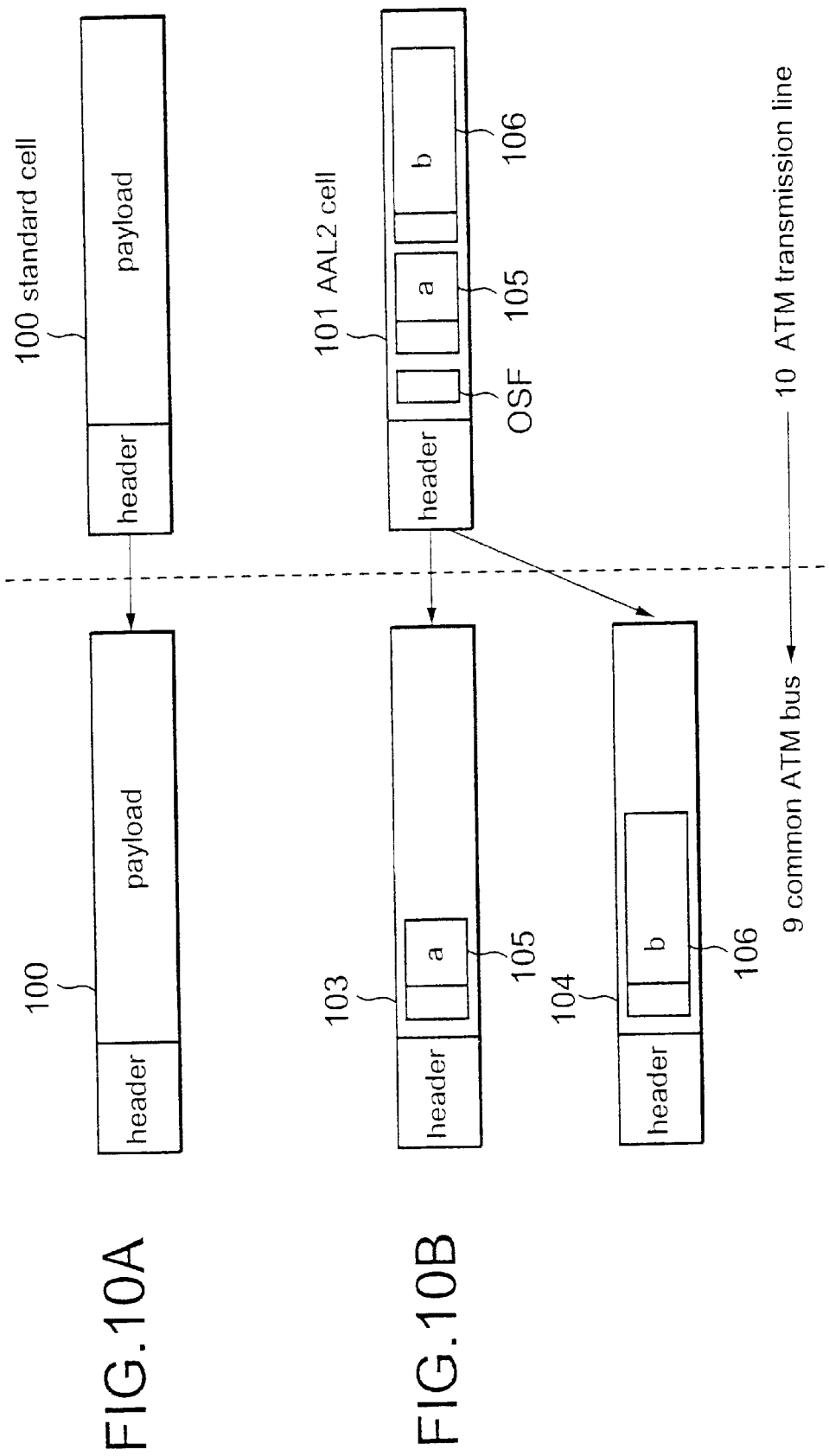
FIG. 10A shows a standard cell on the ATM bus 9 and on the ATM transmission line 10.
FIG. 10B shows an AAL2 cell on the ATM bus 9 and on the ATM transmission line 10.

As shown in FIG. 10A, the format of a standard cell 100 on the ATM transmission line 10 and the format on the common ATM bus 9 are substantially the same. On the other hand, as shown in FIG. 10B, an AAL2 cell 101 which includes short cells 105 and 106 in the payload, on the ATM transmission line 10 is converted to standard cells 103 and 104 which have the same format as the standard cell 100, on the common ATM bus 9. Herein, headers of the ATM cells 103 and 104 are coincident with a header of the original AAL2 cell 101.

Next, more detail description is made about operation of the first embodiment of the invention.

Figure 11:
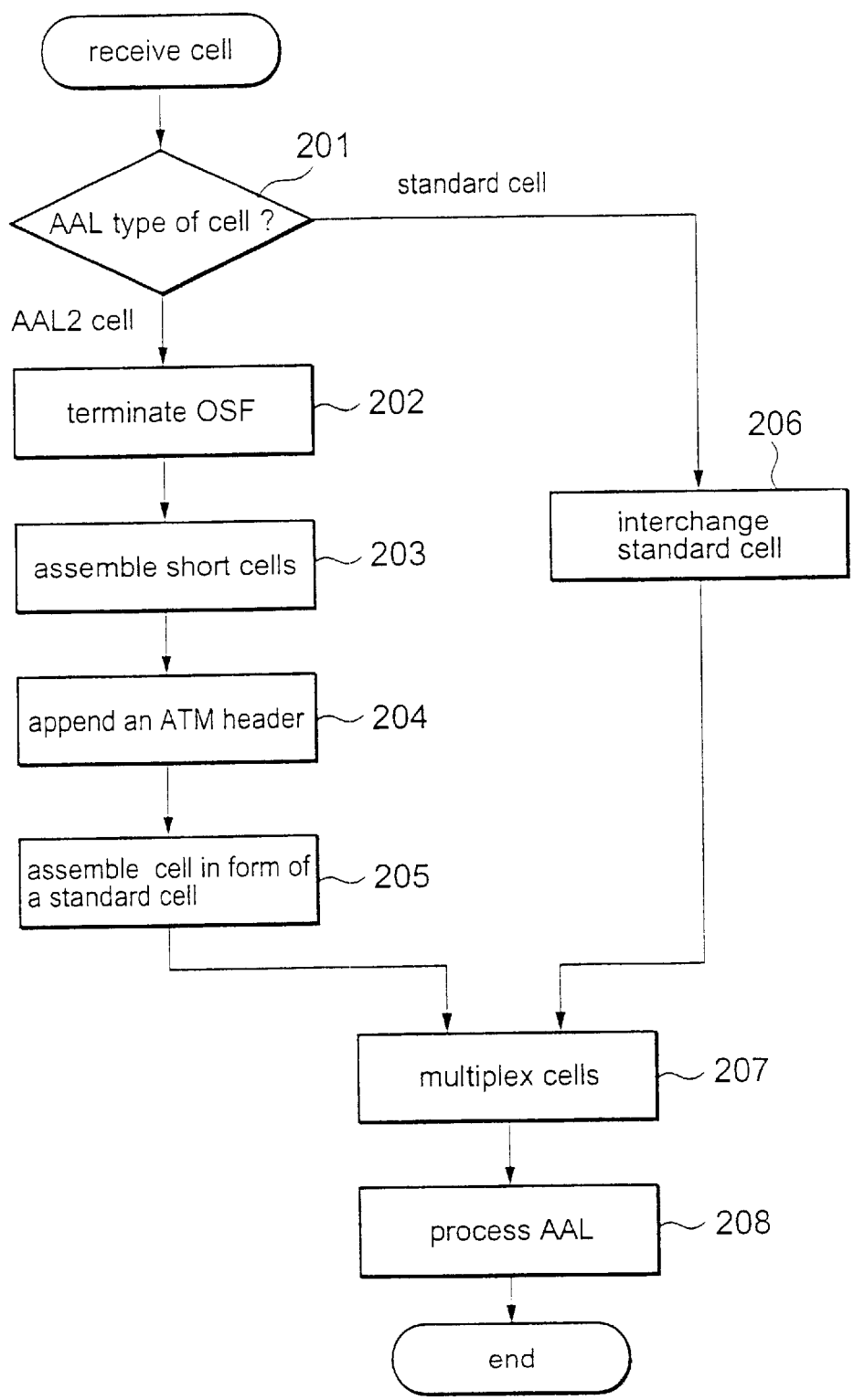
FIG. 11 shows a flowchart of operation of the AAL receiving circuit 2.

As shown in FIG. 11, firstly, when an ATM cell is entered from the exchange 1 to the radio base station 38 via the ATM transmission line 10, the AAL receiving circuit 2 identifies an AAL type of the entered ATM cell at the AAL identifying unit 3 (step 201). This identifying process is done by referring to a VCI in a header of the ATM cell. It is determined that whether the ATM cell is an AAL2 cell or a standard cell according to a value of the VCI in the ATM cell.

When the entered ATM cell is determined as a standard cell (step 201), the ATM cell is simply transferred to the cell multiplexer 6 via the standard cell interchange unit 4 (step 206).

When the entered ATM cell is determined as an AAL2 cell (step 201), terminating process of the AAL2 cell is done by the OSF terminating unit 51 of the AAL2 assembling unit 5 (step 202) and a plurality of short cells into which the AAL2 cell is divided are assembled by the short cell assembling unit 52 as ATM cells (step 203). Then, the ATM header appending unit 53 appends an ATM header to each of the assembled ATM cells (step 204) and the standard cell assembling unit 54 assembles the ATM cells so that the cells may have the same format as a standard cell. Then, the assembled ATM cells are sent to the cell multiplexer 6 (step 205).

The cell multiplexer 6 multiplexes each of the standard ATM cells from the standard cell interchange unit 4 and the ATM cells from the AAL2 assembling unit 5, and supplies them to the common ATM bus 9 (step 207). Lastly, the AAL terminating units $7_1$ to $7_n$ carry out AAL processing of the supplied cells according to their AAL type (step 208).

Figure 12:
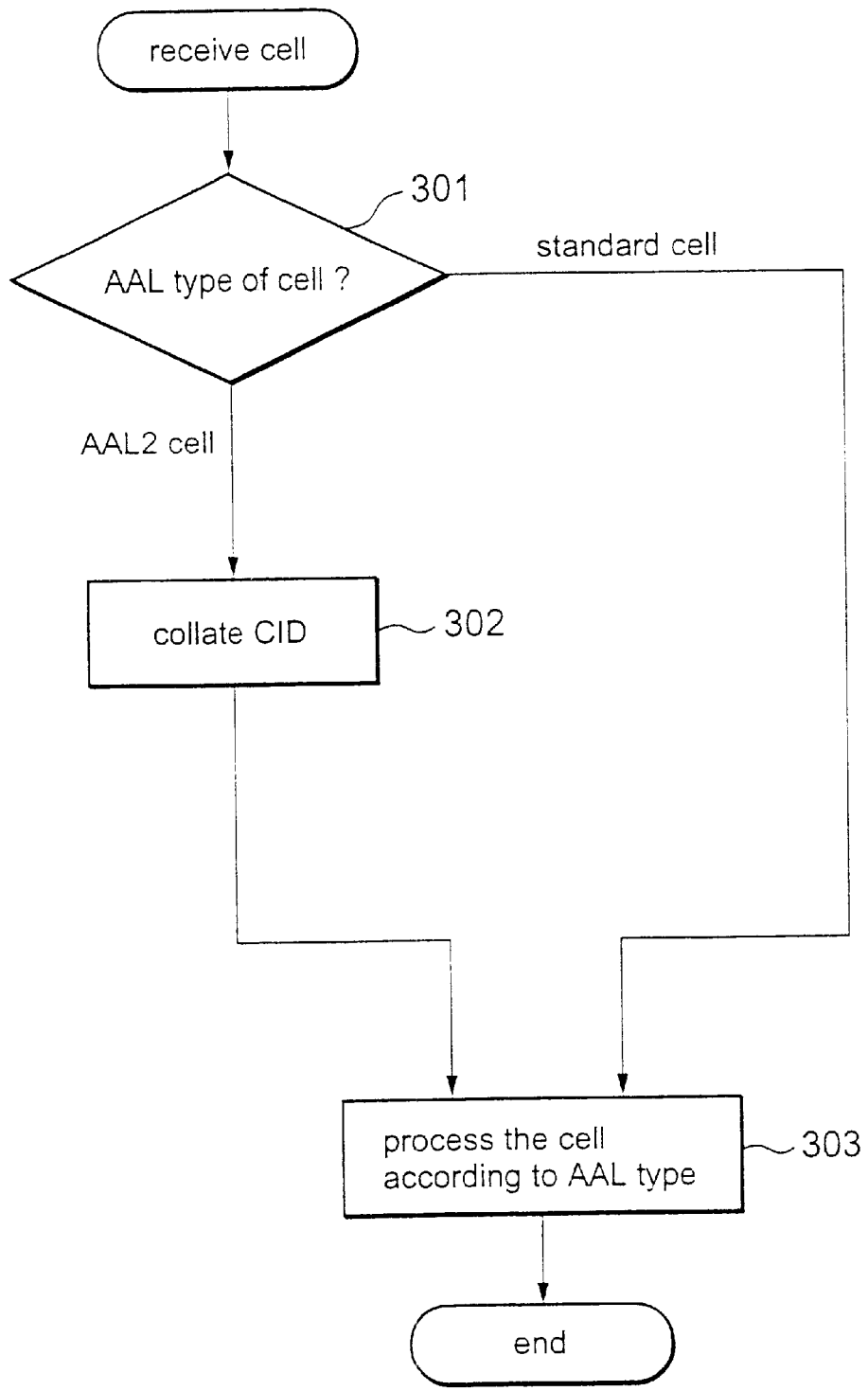
FIG. 12 shows a flowchart of processing at the AAL terminating units 71 to 7n.

Next, more detail description is made about the AAL processing of the step 208 in FIG. 11 with reference to FIG. 12.

At first, an AAL type of an ATM cell entered from the common ATM bus 9 into any of the AAL terminating units $7_1$ to $7_n$ is identified by the VPI/VCI referring unit 11 (step 301). The circuit for referring to a VPI/VCI can be configured by a comparator which can process 24 bits of data (8 bits of VCI and 16 bits of VPI).

When it is determined that the ATM cell entered at step 301 is a standard cell, the ATM cell is passed through the CID referring unit 12 with no change and provided to the cell processing unit 14.

Then, when it is determined that a header of the ATM cell indicates that the cell is an AAL2 cell, the CID referring unit 12 refers to the ATM cell (step 302) since the ATM cell is recognized as a cell from the AAL2 assembling unit 5.

Thereafter, a standard cell and an ATM cell from the AAL2 assembling unit 5 are processed by the cell processing unit 14 according to their AAL type (step 303).

Since the CID has 8 bits length, a comparator which can treat 8 bits of data may be used in the CID referring unit 12. Also, it is easy to configure so that the CID referring unit 12 may not refer to the CID by determining whether or not the entered cell is a standard cell using, for example, a logical gate.

In these AAL terminating unit $7_1$ to $7_n$, when the entered ATM cell is an AAL2 cell which is made by disassembling an AAL2 cell into an ATM header and a plurality of short cells and assembling the ATM header and one of the short cells, the CID is referred to. On the other hand, the entered ATM cell is a standard cell, the CID is not referred to.

Thereby, each AAL type of ATM cells may be processed in a common circuit.

Therefore, even if the radio base station 38 can include n of communication lines, only n of the AAL terminating units $7_1$ to $7_n$ and n of the radio units 23, to 23, are needed. It is clear that this is significant reduction of scale of the circuit compared with the radio base station 88 using the previous AAL receiving circuit as shown in FIG. 4.

Second Embodiment of the Invention

Next, explanation will be made about an AAL receiving circuit of the second embodiment of the invention.

Figure 13:
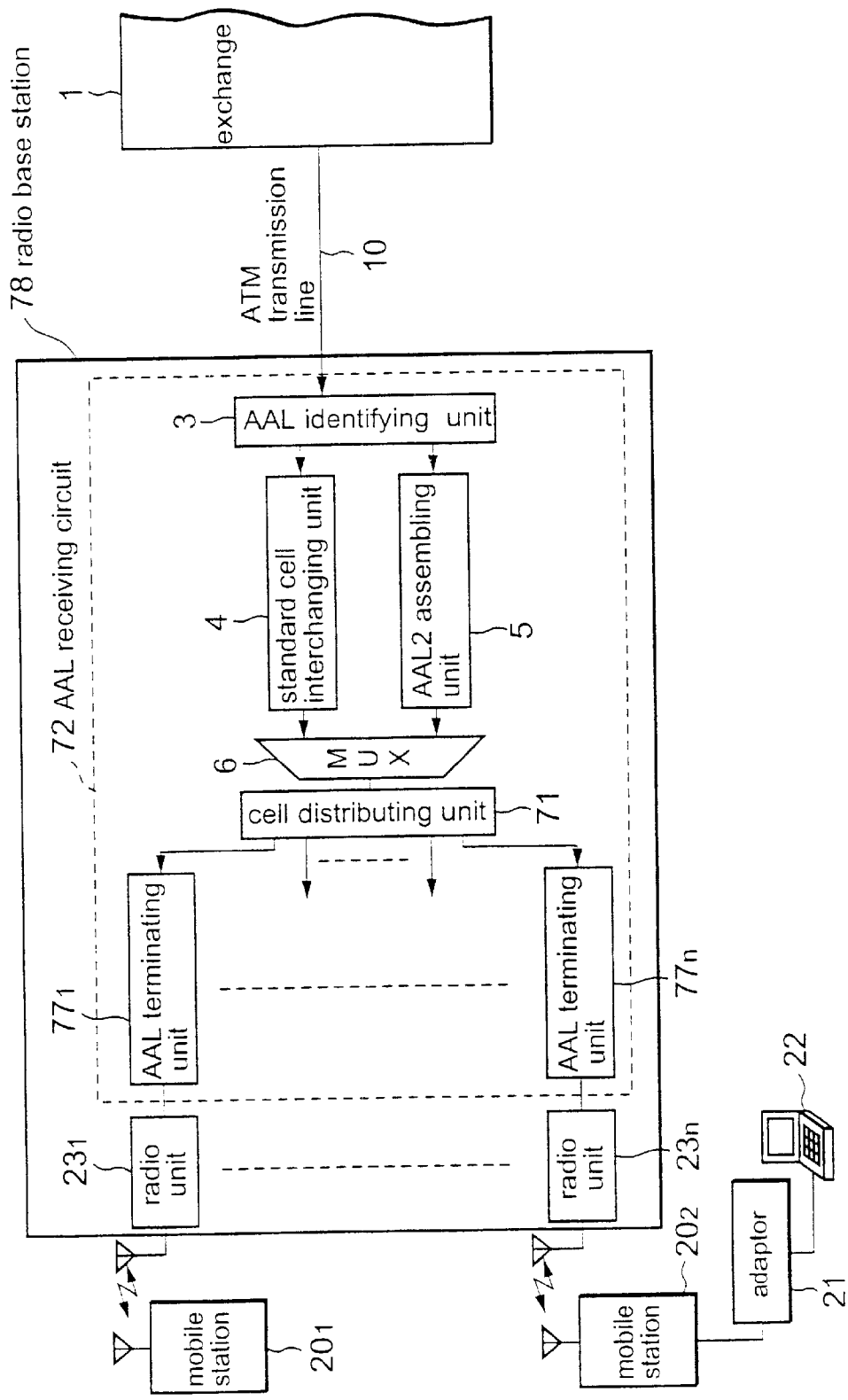
FIG. 13 shows a block diagram of a radio communication system employing the AAL receiving circuit 72 according to the second embodiment of the invention.
Figure 14:
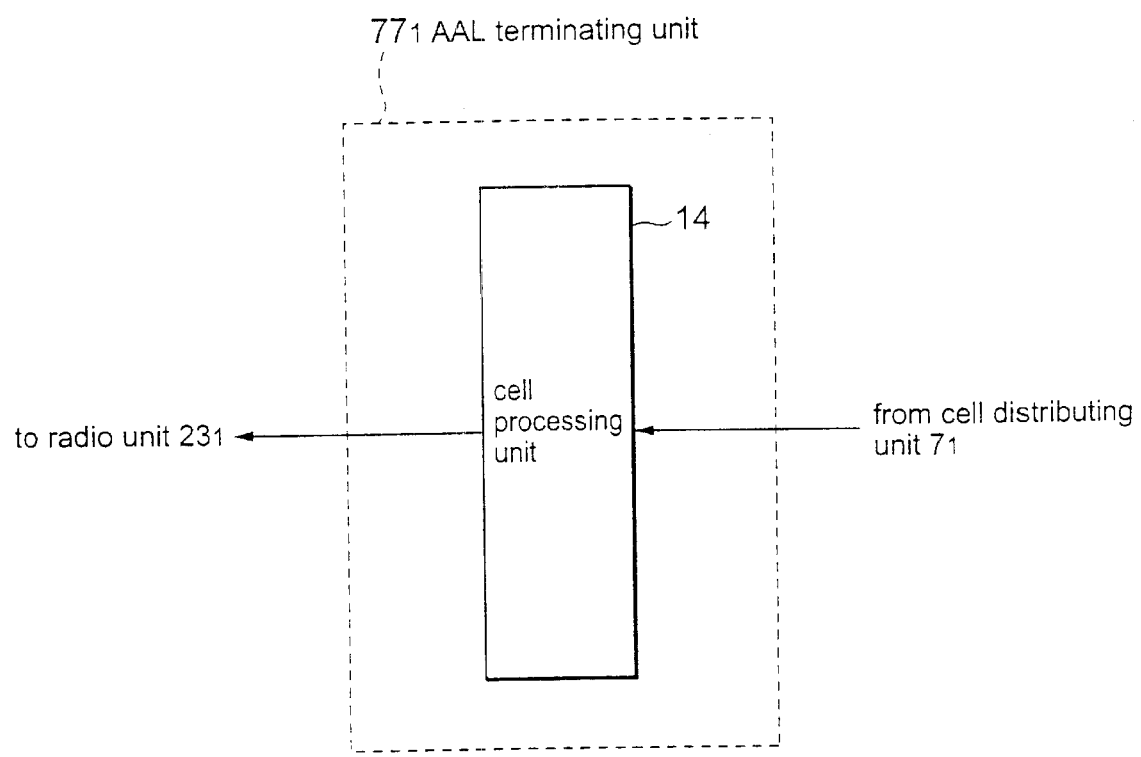
FIG. 14 shows a block diagram of the AAL terminating unit 77, shown in FIG. 13.

Also, parts shown in FIGS. 13 and 14 each of which is the same as the corresponding part shown in FIGS. 8 and 9, respectively, have the same numeric symbols as the corresponding parts shown in FIGS. 8 and 9.

A mobile communication system shown in FIG. 13 includes a plurality of mobile stations ($20_1$, $20_2$, ...) a radio base station 78, and the exchange 1 connected to the radio base station 78 via the ATM transmission line 10.

The radio base station 78 is different from the radio base station 38 shown in FIG. 8 in that the AAL receiving circuit 2 is replaced by an AAL receiving circuit 72.

Also, the AAL receiving circuit 72 is different from the AAL receiving circuit 2 shown in FIG. 8 in that the AAL terminating units $7_1$ to $7_n$ are replaced by AAL terminating units $77_1$ to $77_n$ and the common ATM bus 9 is replaced by a cell distributing unit 71.

The distributing unit 71 includes the VPI/VCI referring unit 11 and the CID referring unit 12 as shown in the AAL terminating unit $7_1$ in FIG. 9, identifies an AAL type and a destination of an ATM cell sent from the cell multiplexer 6, and sends the ATM cell with information about an AAL type to any of the AAL terminating units $77_1$ to $77_n$ that correspond to the destination.

Also, as shown in FIG. 14, each of the AAL terminating units $77_1$ to $77_n$ includes the cell processing unit 14 as shown in FIG. 9 and processes the ATM cell sent from the cell distributing unit 71 according to its AAL type.

In the AAL receiving circuit 72, both of identifying of an AAL type and a destination, and referring to a CID are done by the cell distributing unit 71. Therefore, each of the AAL terminating units $77_1$ to $77_n$ are not required to include the VPI/VCI referring unit 11 and the CID referring unit 12 as the AAL terminating units $7_1$ to $7_n$ do. As a result, each of the AAL terminating units $77_1$ to $77_n$ may have small circuit scale.

However, wiring from the cell distributing unit 71 to each AAL terminating unit $77_1$ to $77_n$ is not simple as compared to the ATM common bus 9, and must individually be connected between them. Therefore, both of efficiency of circuit scale reduction by introducing the AAL terminating units $77_1$ to $77_n$ and influence of complexity of wiring must be considered, and either of the first embodiment or the second embodiment of the invention may be selected.

According to the first embodiment or the second embodiment of the invention, description is made in the case where the radio base station includes a plurality of radio units and is provided with communication lines between the radio units and mobile stations. However, the invention should not be limited to a system used in the above case. Indeed, a mobile communication system using, for example, CDMA or TDMA may achieve multiple communications via frequency, and a spirit of the invention may be applied to such a system.

As described above, the radio communication system according to the invention has following advantages.

(1) Header conversion is achieved by simple configuration of circuit without using a header converting circuit using a header conversion table or a circuit for replacing an ATM header when an AAL2 cell is divided into a plurality of short cells each of which corresponds to a user information and converted to standard cells by assembling each of the short cells. This is because there is no need to convert an information in an ATM header by appending the ATM header to a heading of a short cell (short cell header+short cell payload) so as to take advantage of an identifier CID peculiar to an AAL2 type short cell.

(2) An AAL receiving circuit for processing information in a plurality of types of cell can be configured using a type of bus connection, as a result, connections or circuits are simplified, since an AAL2 cell can be transferred to the same bus as a bus to which a standard cell is transferred by dividing the AAL2 cell into a plurality of short cell and converting to the same format as the standard cell.

(3) It is possible to perform AAL processing of an AAL2 cell and a standard cell at an AAL terminating unit, since ID mask setting unit for receiving an AAL2 cell with disregard for an identifier CID which is peculiar to short cells in the AAL2 cell at the AAL receiving circuit.

What is claimed is:

1. An AAL (ATM Adaptation Layer) receiving circuit which receives an ATM (Asynchronous Transmissions Mode) cell, comprising:
    an AAL identifying unit which identifies an AAL type of the ATM cell based on a value of a VCI (Virtual Channel Identifier) included in the ATM cell;
    a standard cell interchanging unit which receives the ATM cell and transfers the ATM cell with no change when the ATM cell is determined as a standard cell at the AAL identifying unit;
    an AAL2 (AAL Type 2) assembling unit which receives the ATM cell, divides the ATM cell into a plurality of short cells, appends a header of the ATM cell to each of the divided ATM cells, converts each of the header appended divided ATM cells into a form of the standard cell, and transfers each of the converted cells as an ATM cell, when the ATM cell is determined as an AAL2 cell;
    a cell multiplexer which multiplexes the ATM cells which are transferred from the standard cell interchanging unit and the AAL2 assembling unit, and transfers said multiplexed ATM cells to a common ATM bus; and
    at least one AAL terminating unit connected to the common ATM bus, said AAL terminating unit determining the AAL type of the ATM cell which is transferred from the common ATM bus and processing the ATM cell according to the determined AAL type.

2. The AAL receiving circuit claimed in claim 1, wherein the AAL terminating unit processes the ATM cell according to predetermined definition which corresponds to the standard cell when the ATM cell is determined as a standard cell, and determines a destination of the ATM cell by referring to a CID (Channel Identifier) of the ATM cell and processes the ATM cell according to predetermined definition which corresponds to the AAL2 cell when the ATM cell is determined as the AAL2 cell.

3. The AAL receiving circuit claimed in claim 2, wherein the AAL2 assembling unit comprises:
    an OSF (Offset Field) terminating unit which terminates an offset field in a payload of the received AAL2 cell;
    a short cell assembling unit which assembles individual cells from a plurality of short cells in the received AAL2 cell;
    an ATM header appending unit which appends a header which is the same as the header of the ATM cell before divided, to the cells which are assembled at the short cell assembling unit; and
    a standard cell assembling unit which assembles the cell to which the header is appended at the ATM header appending unit into the same form as a standard cell.

4. The AAL receiving circuit claimed in claim 1, wherein the AAL terminating unit further comprises:
    a VPI/VCI (Virtual Path Identifier and Virtual Channel Identifier) referring unit which refers to a VPI/VCI in the ATM cell from the cell multiplexer and determines a destination of the ATM cell and whether the ATM cell is an AAL2 cell or a standard cell;
    a CID referring unit which transfers the ATM cell with no change when the ATM cell is determined as a standard cell at the VPI/VCI referring unit, and refers to a CID of the ATM cell and determines a destination of the ATM cell when the ATM cell is determined as the AAL2 cell; and
    a cell processing unit which processes the ATM cell from the CID referring unit according to its AAL type.

5. The AAL receiving circuit claimed in claim 1, wherein the AAL receiving circuit is included in a radio base station.

6. The AAL receiving circuit claimed in claim 5, wherein the radio base station, an exchange which is connected to the radio base station via an ATM transmission line, and a mobile station which communicates with the radio base station via a communication network are configured to serve a mobile communication system.

7. The AAL receiving circuit claimed in claim 6, wherein communication on the communication network between the mobile station and the radio base station is achieved using CDMA (Code Division Multiple Access).

8. An AAL (ATM Adaptation Layer) receiving circuit which receives an ATM (Asynchronous Transmissions Mode) cell comprising:
    an AAL identifying unit which identifies an AAL type of the ATM cell based on a value of a VCI (Virtual Channel Identifier) included in the ATM cell;
    a standard cell interchanging unit which receives the ATM cell and transfers the ATM cell with no change, when the ATM cell is determined as a standard cell at the AAL identifying unit;
    an AAL2 (AAL Type 2) assembling unit which receives the ATM cell, divides the ATM cell into a plurality of short cells, appends a header of the ATM cell to each of the divided ATM cells, converts each of the header appended divided ATM cells into a form of the standard cell, and transfers each of the converted cells as an ATM cell when the ATM cell is determined as an AAL2 cell;
    a cell multiplexer which multiplexes the ATM cells which are transferred from the standard cell interchanging unit and the AAL2 assembling unit, and which transfers them to a common ATM bus;
    a cell distributing unit which determines the AAL type of the ATM cell which is transferred from the cell multiplexer and transfers the ATM cell with processing according to the determined AAL type; and
    at least one AAL terminating unit which processes the ATM cell from the cell distributing unit according to the determined AAL type.

9. The AAL receiving circuit claimed in claim 8, wherein the cell distributing unit determines a destination of the ATM cell from a VPI/VCI (Virtual Path Identifier/Virtual Channel Identifier) in a header of the ATM cell and transfers the ATM cell to a communication network which corresponds to the destination when the ATM cell is determined as a standard cell, and determines a destination of the ATM cell by referring to a CID (Channel Identifier) of the ATM cell and transfers the ATM cell to a communication network which corresponds to the destination when the ATM cell is determined as an AAL2 cell.

10. The AAL receiving circuit claimed in claim 8, herein the AAL2 assembling unit comprises:
   an OSF terminating unit which terminates an offset field in a payload of the received AAL2 cell;
   a short cell assembling unit which assembles individual cells from a plurality of short cells in the received AAL2 cell;
   an ATM header appending unit which appends a header which is the same as the header of the ATM cell before divided, to the cells which are assembled at the short cell assembling unit; and
   a standard cell assembling unit which assembles the cell to which the header is appended at the ATM header appending unit in the same form as a standard cell.

11. The AAL receiving circuit claimed in claim 8, wherein the AAL receiving circuit is included in a radio base station.

12. The AAL receiving circuit claimed in claim 11, wherein the radio base station, an exchange which is connected to the radio base station via an ATM transmission line, and a mobile station which communicates with the radio base station via a communication network are configured to serve a mobile communication system.

13. The AAL receiving circuit claimed in claim 12, wherein communication on the communication network between the mobile station and the radio base station is achieved using CDMA.

14. A method of AAL (ATM Adaptation Layer) processing of an ATM (Asynchronous Transmissions Mode) cell comprising the steps of:
   identifying an AAL type of a received ATM cell based on a value of a VCI (Virtual Channel Identifier) of the ATM cell;
   dividing the ATM cell into a plurality of short cells, appending a header of the ATM cell to the short cells, and converting each of the header appended divided ATM cells into the same form as a standard ATM cell, only when the ATM cell is determined as an AAL2 (AAL Type 2) cell;
   multiplexing standard ATM cells and the ATM cells which are obtained by the above conversion, and transferring the multiplexed cells to a common ATM bus; and
   referring to an AAL type of the ATM cell from the common ATM bus, processing the ATM cell according to predetermined definition which corresponds to the standard cell when the ATM cell is determined as a standard cell;
   determining a destination of the ATM cell by referring to a CID (Channel Identifier) of the ATM cell and processing the ATM cell according to predetermined definition which corresponds to the AAL2 cell when the ATM cell is determined as a AAL2 cell.

15. A method of AAL (ATM Adaptation Layer) processing of an ATM (Asynchronous Transmissions Mode) cell comprising the steps of:
   identifying an AAL type of the ATM cell based on a value of a VCI (Virtual Channel Identifier) of the ATM cell;
   dividing the ATM cell into a plurality of short cells, appending a header of the ATM cell to the short cells, and converting the header appended divided ATM cells into the same form as a standard ATM cell only when the ATM cell is determined as an AAL2 (AAL Type 2) cell;
   multiplexing standard ATM cells and the ATM cells which are obtained by the above conversion, and transferring the multiplexed cells to a common ATM bus; and
   determining a destination of the ATM cell from a VPI/VCI (Virtual Path Identifier and Virtual Channel Identifier) in a header of the ATM cell and transferring the ATM cell to a communication network which corresponds to the destination when the ATM cell is determined as a standard cell, and determining a destination of the ATM cell by referring to a CID (Channel Identifier) of the ATM cell and transferring the ATM cell to a communication network which corresponds to the destination when the ATM cell is determined as an AAL2 cell; and
   processing, at the communication network, the ATM cell according to the AAL type of the ATM cell.

16. A receiving circuit which receives a packet, comprising:
   a determining unit which determines whether the received packet has a first type defined by a standard structure or a second type defined by a structure including multiple messages each of which is to be sent in a packet;
   a standard packet interchanging unit which receives the packet and transfers the packet with no change when the packet is determined as a packet of the first type at the determining unit;
   an assembling unit which is operable in response to the second type of the received packet and which receives the packet, divides the packet for each messages in the packet, appends a header of the packet to each of the divided messages, converts the header appended divided messages into a form of an individual packet, and transfers the individual packet as a packet; a
   packet multiplexer which multiplexes the packets transferred from the standard packet interchanging unit and the assembling unit, and which transfers the multiplexed packets to a common bus; and
   at least one terminating unit which determines either one of the first and the second types transferred from the common bus and which processes the packet according to the determined type of the packet.

17. A method of receiving a packet, comprising the steps of:
   (a) determining whether the received packet has a first type defined by a standard structure or a second type defined by a structure including multiple messages each of which is to be sent in a packet;
   (b) receiving the packet and transferring the packet with no change when the packet is determined as a packet of the first type;
   (c) receiving the packet, dividing the packet for each messages in the packet, appending a header of the packet to each of the divided messages, converting the header appended packets into a form of individual packets, and transferring the individual packets as a packet, when the packet is determined a packet of the second type;
   (d) multiplexing the packets which are formed by (b) and (c), and transferring the packets; and
   (e) determining either one of the first and the second types and processing the packet according to the determined type.

* * * * *